3,547,956
METHOD OF DRYING ALKYLENE OXIDES
Harry A. Smith, Midland, Mich., assignor to The Dow Chemical Company, Midland, Mich., a corporation of Delaware
No Drawing. Filed June 14, 1968, Ser. No. 736,970
Int. Cl. C07d 1/12
U.S. Cl. 260—348                                     7 Claims

ABSTRACT OF THE DISCLOSURE

A process for drying of alkylene oxides which comprises contacting water-containing alkylene oxides in the liquid phase at a temperature of from about −192 to about +50° C. with sufficient perhaloacetone to form perhaloacetone hydrate with the water present and separating the dry alkylene oxide from the perhaloacetone hydrate.

---

This invention relates to an improved and novel process for drying polymerizable epoxide monomers and more particularly relates to a process whereby alkylene oxides are rendered substantially anhydrous without adversely affecting the properties of such monomers.

It is known that for purposes of copolymerization, particularly with such monomers as hexafluoroacetone, it is highly desirable that the epoxide monomers to be employed be substantially anhydrous. The presence of even small amounts of water have been found to be extremely detrimental to the rate of polymerization and/or to cause a severe reduction in the molecular weight of the final copolymer. While numerous drying agents for organic compounds are known in the art, it has been found that when such drying agents are employed to remove water from alkylene oxides, numerous problems are presented, e.g., the drying agent either polymerizes the epoxide or it is ineffective in the removal of water to a sufficiently low level.

It is an object of this invention to provide an improved process for the drying of alkylene oxides. A further object is to provide a process for preparing substantially anhydrous alkylene oxides without causing polymerization thereof. These and other objects and advantages of the present invention will become apparent from the reading of the following detailed description.

It has now been discovered that alkylene oxides are dried effectively to below about 30 p.p.m. of water without any detrimental effect on such alkylene oxides by combining in the liquid or solid phase the epoxide or mixture of epoxides to be dried with a sufficient proportion of perhaloacetone to form a hydrate of the perhaloacetone with the water present. To achieve this result, the perhaloacetone and the alkylene oxide to be dried are mixed as relatively cold liquids, e.g., at a temperature of between about −192 and the boiling point of the perhaloacetone, e.g., HFA (−27.4° C. at atmospheric pressure), whereupon any water contained in the alkylene oxide forms a relatively stable hydrate with the perhaloacetone. The dried alkylene oxide is then easily separated from the perhaloacetone hydrates by distillation. This process is likewise advantageous where it is desirable to produce interpolymers of alkylene oxides and perhaloacetone either as a copolymer or as an interpolymer with additional monomers. When interpolymers containing both a perhaloacetone and an alkylene oxide are desired, sufficient perhaloacetone is employed to form both a hydrate with the water present in the system and to provide the desired amount of perhaloacetone monomer for the copolymerization with the alkylene oxide. The mixture of substantially anhydrous monomers is then separated from the perhaloacetone hydrate and polymerized in the usual manner, such as, for example, contacting the mixture of monomers with an initiator such as CsF at a temperature of from about 0° C. to about 75° C. under autogenous pressure.

The term "halo" as used herein with reference to the perhaloacetone drying agent and monomer is meant to include chloro- and fluoro-substituents. Perhaloacetones suitable for use as drying agents in the present invention include perfluoroacetone (hexafluoroacetone) and perchloroacetone (hexachloroacetone) as well as mixed chloro- and fluoro-substituted acetones. Illustrative of mixed perhalosubstituted acetones include dichlorotetrafluoroacetone, tetrachlorodifluoroacetone, monochloropentafluoroacetone and the like. As is typical of the perhaloacetones, hexafluoroacetone forms hydrates containing 1, 1.5, and 3 moles of water per mole of hexafluoroacetone. The monohydrate has a melting point of about 40° C. but upon heating above 40° C. is converted to the trihydrate which has a boiling point of about 106° C. at atmospheric pressure. In separation of the dried alkylene oxide from the hexafluoroacetone, it is desirable to maintain the bottoms temperature during distillation at less than about 105° C. in order to achieve rapid and effective separation.

Where even lower water concentrations in the dried alkylene oxide are required, it has been found desirable to employ, in admixture with the perhaloacetone drying agent, up to about 15 weight percent BaO based on the amount of perhaloacetone employed.

Alkylene oxides suitable for use in this process include those aliphatic alkylene oxides having from 2 to about 4 carbons in the hydrocarbon chain e.g. 1,2-epoxyethane (ethylene oxide), 1,2-epoxypropane (propylene oxide), 1,2-epoxybutane (butylene oxide), cis and trans 2,3-epoxybutane, and the like. When such alkylene oxides are dried according to the process of this invention, the water content thereof is uniformly reduced to less than about 30 p.p.m. It has been found that water concentrations of up to about 30 p.p.m. in alkylene oxide monomers does not significantly effect the rate of polymerization of such alkylene oxides in copolymerization reactions and does not substantially limit the molecular weight of the copolymer product.

The following examples are provided to more fully illustrate the invention but are not to be construed as limiting to the scope of such invention.

EXAMPLE 1

A 2.5 gm. sample of propylene oxide containing 770 p.p.m. water was cooled to a temperature of −192° C. and 0.18 gm. of anhydrous hexafluoroacetone at −192° C. was added thereto. The mixture, after warming to liquify the components, was agitated to achieve thorough mixing. At a temperature of about 23° C. the propylene oxide was separated as gas, under reduced pressure, from the hexafluoroacetone hydrate. The product propylene oxide was collected for analysis which showed such product to have a water content of 20 p.p.m.

EXAMPLE 2

In a manner similar to Example 1, 2.5 gm. samples of alkylene oxide containing 770 p.p.m. water, were admixed with 3.0 gm. samples of anhydrous hexafluoroacetone or mixtures of 3.0 gm. of hexafluoroacetone with about 0.2 gm. of BaO. After mixing the propylene oxide and hexafluoroacetone (or HFA-BaO mixture) at below −27° C., the mixture was warmed to room temperature and the gaseous mixture of propylene oxide and hexafluoroacetone was separated by vacuum distillation from the hexafluoroacetone hydrate. Results of these experiments are shown in the following Table I:

TABLE I

| Sample No. | Monomers | Epoxide drying agent | Epoxide H₂O content after drying, p.p.m. |
|---|---|---|---|
| 1 | Propylene oxide | Hexafluoroacetone. | 20 |
| 2 | Ethylene oxide | do | 20 |
| 3 | Hexafluoroacetone+propylene oxide | do | 20 |
| 4 | do | Hexafluoracetone +barium oxide. | 12 |
| 5 | Hexafluoroacetone+propylene oxide+ ethylene oxide.[1] | Hexafluoroacetone | 20 |
| 6 | Hexafluoroacetone+propylene oxide | Hexafluoroacetone+barium oxide. | 8 |
| 7 | Hexafluoroacetone+ethylene oxide+ butylene oxide.[2] | do | 10 |

[1] PO to EO wt. ratio of 30:70.
[2] E.O. to B.O. wt. ratio of 20:20.

EXAMPLE 3

For purposes of comparison with the drying agents of this invention, a number of standard drying agents for organic compounds were employed in an attempt to dry alkylene oxides. Where mixed alkylene oxides were employed, the weight ratio of such oxides was about 1:1. In all instances, an excess of the drying agent was employed over that theoretically required to remove the 770 p.p.m. water content of the sample to be dried. The drying agent was contacted with the monomer or mixture of monomers at 23° C. for a period of from 5 minutes to 24 hours. The results of these experiments are shown in the following Table II:

TABLE II.—PROPYLENE OXIDE WAS USED AS THE MONOMER IN ALL SAMPLES

| Sample No. | Drying agent | Epoxide H₂O content after drying, p.p.m. |
|---|---|---|
| 1 | $H_3PO_4$, $P_2O_5$ | Polymerizes epoxide. |
| 2 | $LiAlH_4$ | Ignites epoxide. |
| 3 | $NaBH_4$ | Reacts with epoxide. |
| 4 | $CaH_2$ | 270. |
| 5 | Na | Polymerizes epoxide. |
| 6 | $Al_2O_3$ | 310. |
| 7 | $CaSO_4$ | 120. |
| 8 | Molecular sieves | 150. |

I claim:

1. A process for drying alkylene oxides which comprises contacting a water-containing alkylene oxide having from 2 to 4 carbon atoms with a perhaloacetone selected from the group consisting of perchloroacetone and perfluoroacetone at a temperature of from about $-192°$ C. to the boiling point of the perhaloacetone to form a hydrate of the perhaloacetone, heating the mixture to a temperature sufficient to vaporize the epoxide to thereby separate the dried alkylene oxide from the perhaloacetone hydrate.

2. The process of claim 1 wherein the perhaloacetone is hexafluoroacetone.

3. The process of claim 1 wherein the perhaloacetone is employed in excess of that required to form a hydrate with the water present in the alkylene oxide.

4. The process of claim 1 wherein the alkylene oxide is propylene oxide.

5. The process of claim 1 wherein the perhaloacetone is hexafluoroacetone and the alkylene oxide is propylene oxide.

6. The process of claim 1 wherein the alkylene oxide is a mixture of ethylene oxide and propylene oxide.

7. The process of claim 1 wherein the perhaloacetone is employed in admixture with up to about 15% by weight of BaO based on the weight of perhaloacetone employed.

No references cited.

NORMA S. MILESTONE, Primary Examiner